Oct. 24, 1967   J. W. ORENDORFF   3,348,620
HITCH FOR IMPLEMENTS
Filed Sept. 28, 1964   3 Sheets-Sheet 3
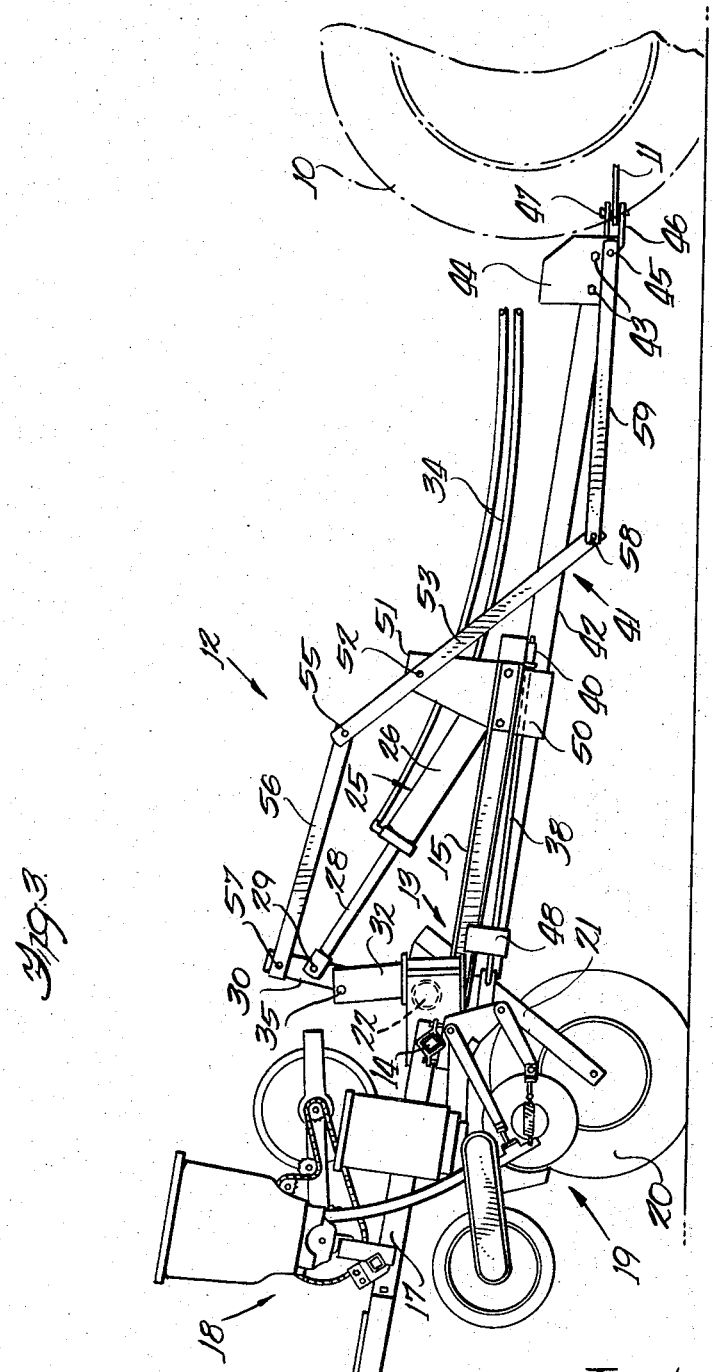

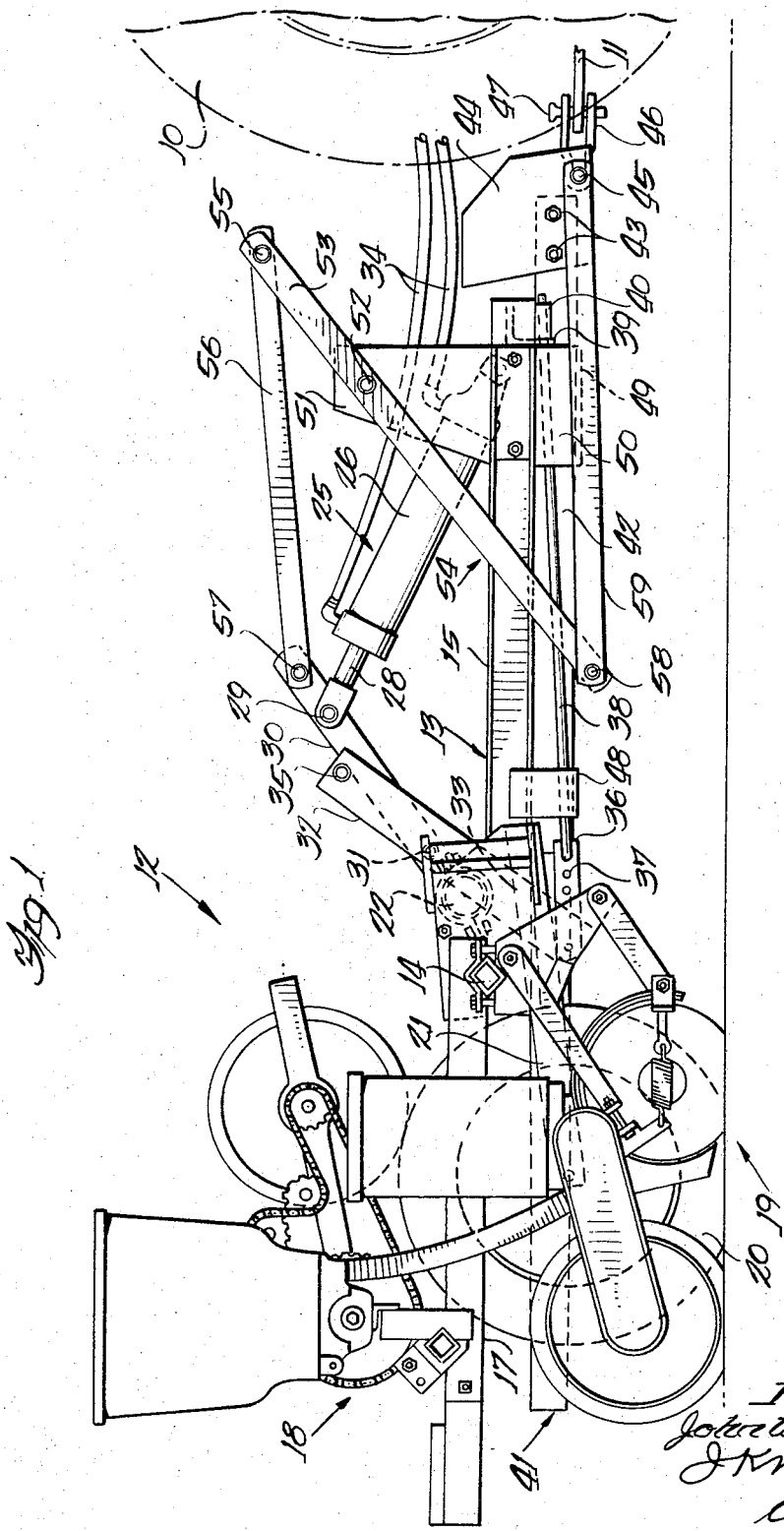

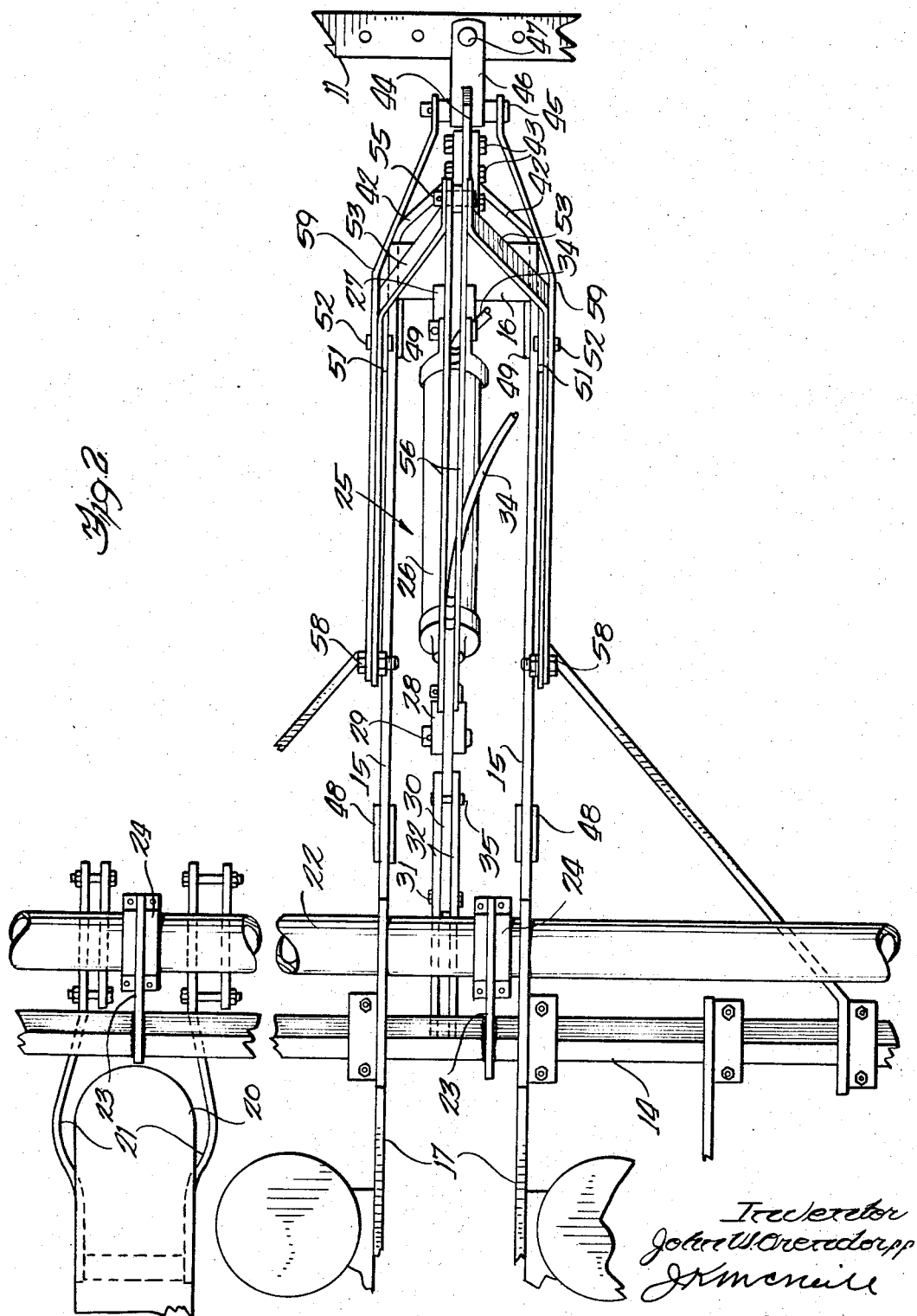

United States Patent Office 3,348,620
Patented Oct. 24, 1967

3,348,620
HITCH FOR IMPLEMENTS
John W. Orendorff, Downers Grove, Ill., assignor to International Harvester Company, a corporation of Delaware
Filed Sept. 28, 1964, Ser. No. 399,539
6 Claims. (Cl. 172—316)

ABSTRACT OF THE DISCLOSURE

An implement drawn by a tractor is connected to the tractor by longitudinally relatively movable hitch sections permitting close coupling of the implement to the tractor and better control thereof during operation, while allowing the distance of the implement behind the tractor to increase substantially in the transport position, facilitating transport of the implement. This is accomplished and the relative movement of the hitch sections controlled by pivoting a rockable member on one of the hitch sections, connecting one end of the rockable member to the tractor and the other to the implement and using a hydraulic cylinder to rock said member.

---

This invention relates to vehicle and trailer combinations and particularly to agricultural implements of the trail-behind type adapted to be connected to a tractor in draft-receiving relation to follow in the path thereof. More specifically, the invention concerns novel hitch means for connecting an implement or the like to a tractive vehicle.

Many implements, particularly wide-spread multi-row implements such as planters, cultivators and the like, are better controlled for field operation when relatively closely coupled to the propelling vehicle; however, when turning the tractor and implement, as at the end of the field, an extremely large turning radius is required to provide the necessary clearance between the tractor and implement to prevent engagement of the latter with the tractor wheel. The present invention was designed to overcome this disadvantage, and has for its object the provision of novel hitch means for connecting an implement to a tractor.

Another object of the invention is the provision of novel hitch means for a tractor connected implement whereby the implement is trailed relatively far behind the tractor to improve the tracking characteristics of the implement and insure the necessary clearance between the tractor and the implement when turning and in transport, and is advanced toward the tractor for better control of the implement during operation.

Another object of the invention is the provision of an implement hitch including relatively movable or telescopic parts actuated by the raising and lowering of the implement to dispose the implement farther from or nearer to the tractor.

Other objects and advantages of the invention will become clear from the following detailed description when read in conjunction with the accompanying drawings wherein:

FIGURE 1 is a view in side elevation of an implement incorporating the features of this invention connected to the drawbar of a tractor;

FIGURE 2 is a plan view, on an enlarged scale, of a portion of the structure shown in FIGURE 1, and FIGURE 3 is a view in side elevation, on a smaller scale, of the structure shown in FIGURE 1 with the implement in transport position.

In the drawings the numeral 10 designates a tractor having a drawbar 11 to which is connected an implement in the form of a multi-row planter 12. The planter of this invention is of the trailing type having a supporting frame 13 including a transversely-extending tool bar 14 to the lower side of which are affixed spaced forwardly extending bars forming a hitch 15, and the forward ends of which are connected by a web 16. To the top of tool bar 14 are secured rearwardly-extending laterally-spaced bars 17 upon which are mounted laterally-spaced fertilizer units 18, a seed-planting assembly 19 being provided for each fertilizer unit and mounted on the tool bar 14. It may be understood that the constructional details of the seed planting and fertilizer depositing units form no part of this invention and for the purposes thereof may be regarded as of any well-known type.

The implement-supporting frame 13 is mounted on laterally-spaced ground-engaging wheels 20, only one of which is shown, and each of which is carried by rearwardly and downwardly extending arms 21, the forward ends of which are affixed to a rockshaft 22, extending transversely parallel to tool bar 14 and affixed thereto by forwardly-directed lugs 23 carrying bearing clamps 24.

By rocking shaft 22, arms 21 and wheel 20 are swung in a vertical plane about the axis of the shaft, swinging the arms counterclockwise in FIGURES 1 and 3 raising the implement as from the operating position of the planter shown in FIGURE 1 to the non-operating or transport position indicated in FIGURE 3.

Rocking of shaft 22 to raise and lower the implement is accomplished by the provision of a hydraulic jack 25 comprising a cylinder 26 pivotally connected to a bracket 27 mounted on the member 16 of the hitch, and a piston rod 28 slidable in the cylinder and pivotally connected at 29 to a link 30, the lower end of which is pivoted at 31 between the arms of a lever 32 affixed to tubular member 22 and having a portion 33 projecting therebelow.

Fluid under pressure is supplied to cylinder 26 from a source, not shown, on the tractor through hose lines 34 to extend and retract the rod 28 in the cylinder. As shown in FIGURES 1 and 3, extension of the rod in the cylinder causes link 30 to engage a pin 35 at the upper end of lever 32 and rock the lever in a counterclockwise direction to swing the wheel arms 21 downwardly relative to the implement frame and vertically move the planter structure from the operating position of FIGURE 2 to the transport position of FIGURE 3. Retraction of the piston rod in the cylinder allows the implement frame structure to lower by its own weight. Adjustment of the position of wheels 20 relative to the implement frame to vary the operating depth of the earthworking tools is accomplished by the provision of a plate 36 pivoted to the lower end of extension arm 33 of lever 32 and having a plurality of openings 37 therein for connection to one end of a rod 38, the forward end of which is slidable in an opening in a lug 39 secured to the member 16, sliding movement of the rod in one direction being limited by the provision of a collar 40 secured to the end of the rod.

An auxiliary hitch frame 41 comprises laterally-spaced bars 42, the forward ends of which, as shown in FIGURE 2, converge and are secured by bolts 43 to an upright hitch plate 44 carrying a pivot pin 45 upon which is mounted a clevis 46 connected by a pivot pin 47 to the drawbar 11 of the tractor.

Auxiliary hitch frame 41 extends rearwardly and the side bars 42 thereof are disposed parallel to and below the side bars of hitch frame 15. Side bars 42 rest and are slidably received in hangers 48, which are U-shaped to receive the bars. The forward ends of the bars are likewise received in the U-shaped portion 49 of brackets 50 secured to and depending from hitch bars 15.

Upward extensions 51 of brackets 50 are provided with pivot pins 52 upon which are mounted laterally-spaced members 53 forming a lever designated by the numeral 54. The upper ends of arms 53 converge and are provided with a pivot pin 55 upon which is mounted a rearwardly-extending link 56 comprising laterally-spaced parts straddling the upper end of link 30 and mounted on a pivot pin 57.

The lower ends of members 50 are pivotally connected by a bolt 58 to the rear ends of forwardly-extending links 59, the forward ends of which are mounted upon the pivot pin 45 through which draft is transmitted from the tractor to the implement.

When the implement is raised to its transport position rod 28 is extended in cylinder 26 to rock link 30 and lever 32 counterclockwise about the axis of shaft member 22. This rocks wheel arms 21 downwardly and simultaneously rocks lever 54 about the axis of pin 52, to the raised position shown in FIGURE 3. With the lowering of the wheels, link 53 exerts a force rearwardly against the implement frame and link 59 exerts a force forwardly against the tractor drawbar 11 to telescope auxiliary frame 42 in guide members 48 and 49 to increase the distance of the implement behind the tractor for the reasons hereinbefore set forth.

It is believed that the construction and operation of the novel implement hitch means of this invention will be clearly understood from the foregoing description. It should likewise be understood that the invention has been described in its preferred embodiment and that modifications may be made therein without departing from the spirit thereof or the scope of the appended claims.

What is claimed is:

1. In an implement adapted to be connected to and propelled by a tractor having a drawframe thereon, a tool-carrying frame extending therebetween and the tractor comprising a main hitch section mounted on the tool-carrying frame and a draft hitch section connected to the tractor drawframe in telescopic association with said main hitch section, and power transmission means operatively connecting said sections for telescoping one of said sections relative to the other to selectively vary the longitudinal spacing between the tool-carrying frame and the tractor.

2. In an implement adapted to be connected to and propelled by a tractor having a drawframe thereon, a tool-carrying frame extending therebetween and the tractor comprising a main hitch section mounted on the tool-carrying frame and a draft hitch section connected to the tractor drawframe in telescopic association with said main hitch section, and power transmission means operatively connecting said sections for telescoping one of said sections relative to the other to selectively vary the longitudinal spacing between the tool-carrying frame and the tractor, said power transmission means including a lever fulcrumed on said main hitch section and link means connecting one end of the lever to said main section and the other end of said draft section, said lever being pivotable about its fulcrum to effect telescoping of said hitch sections.

3. The invention est forth in claim 2, wherein said power transmission means includes a hydraulic cylinder mounted on the tool-carrying frame and operatively connected to said lever to rock the latter about its pivot axis.

4. The invention set forth in claim 3, wherein said tool-carrying frame is vertically movable between operating and non-operating positions, and wherein said hydraulic cylinder is operatively connected to said tool-carrying frame to vertically move the latter simultaneously with the rocking of said lever to telescope said hitch sections.

5. The invention set forth in claim 4, wherein a shaft is rockably mounted on said tool-carrying frame and carries supporting wheels which are vertically swingable relative to said tool-carrying frame upon rocking the shaft to raise and lower the tool-carrying frame, said hydraulic cylinder being operatively connected to said shaft and to said lever for rocking said shaft upon rocking said lever.

6. Adjustable hitch means for an implement having a tool-carrying frame adapted to be connected to a tractor comprising, a first hitch section secured to said tool-carrying frame, a second hitch section telescopically associated with said first hitch section and having one end adapted for connection to the tractor in draft-receiving relation, a rockable member pivotally mounted medially of its ends on one of said hitch sections for swinging forwardly and rearwardly relative thereto, means connecting one of said hitch sections to one end of said rockable member, and means connecting the other of said hitch sections to the other end of said rockable member, whereby rocking of said rockable member causes relative telescopic movement of said hitch sections.

References Cited

UNITED STATES PATENTS

| | | | |
|---|---|---|---|
| 2,107,723 | 2/1938 | White | 172—319 |
| 3,059,705 | 10/1962 | Oehler et al. | 111—52 X |

ABRAHAM G. STONE, *Primary Examiner.*

J. R. OAKS, *Assistant Examiner.*